United States Patent Office 3,399,539
Patented Sept. 3, 1968

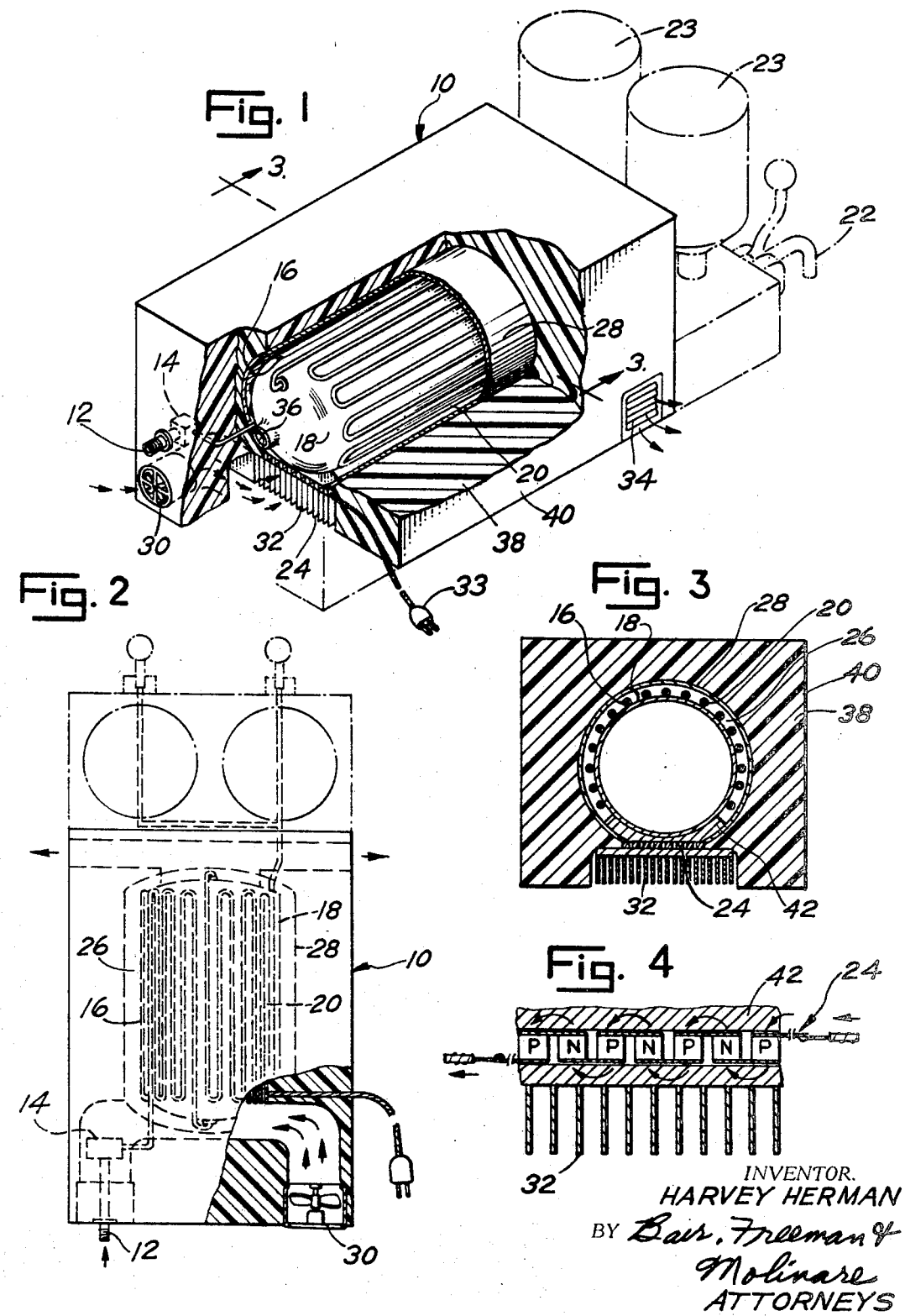

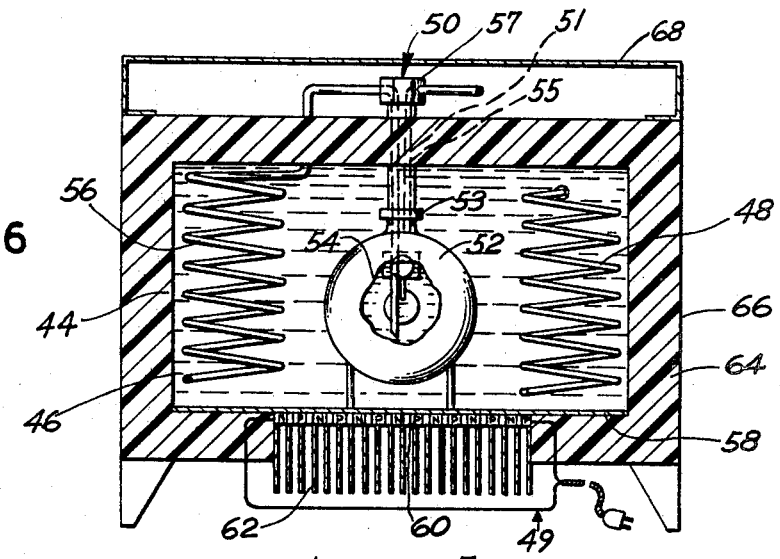
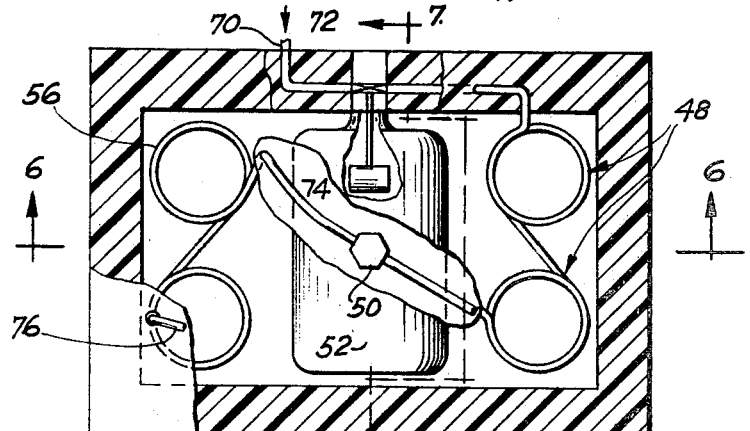
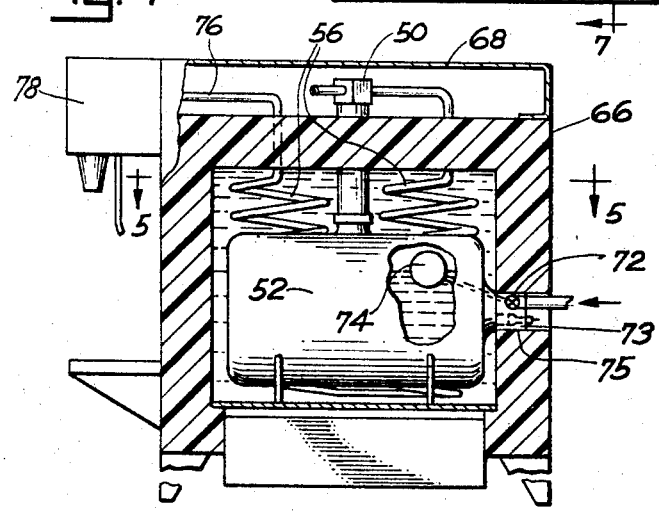

3,399,539
COOLING UNIT
Harvey Herman, 3926 W. Greenleaf,
Lincolnwood, Ill. 60645
Filed Mar. 13, 1967, Ser. No. 622,815
5 Claims. (Cl. 62—3)

ABSTRACT OF THE DISCLOSURE

A refrigeration device for converting relatively warm "tap-water" into cold, carbonated water. The "table-top" device, which utilizes a thermoelectric saddle, is suitable for use as a soda-water dispenser in soda shops, restaurants and bars. Cooling coils and a carbonation tank are placed within a container filled with fluid. The thermoelectric saddle is placed in a wall of the container and removes heat from the fluid. The fluid behaves as a "cold storage" buffer between the slow but steady heat-pumping capabilities of the thermoelectric saddle and high-level but infrequent cooling requirements created by the intermittent demands for cold soda water.

Background of the invention

This invention relates to a refrigeration device utilizing the so-called "Peltier effect" and, more particularly, to a refrigeration device for producing cold, carbonated water for use in soft drinks and the like.

Generally, a compressor-type refrigeration unit is used to cool carbonated water at soda fountains or malt shops. Such refrigeration units are made from cumbersome compressors combined with intricate tubing and valving. Their portability is restricted by the bulky components. Furthermore they are relatively expensive to build and repairs are costly.

In an effort to create a more compact cooling device, attempts have been made to utilize the well known "Peltier effect" for refrigeration. This is a thermoelectric phenomenon observed at the junction of certain dissimilar metals in a direct current circuit. When current flows across the junction, heat is transferred from one of the metals to the other.

The potential utility of the Peltier effect in a "solid-state" refrigeration system has been recognized for many years. U.S. Patent 484,182 issued to M. W. Dewey on Oct. 11, 1892 discloses an early method of refrigeration using the Peltier effect. More recent devices are disclosed in U.S. Patent 3,212,274 granted to W. Eidus on Oct. 19, 1964 and U.S. Patent 3,137,141 granted June 16, 1964 to G. A. Kistler. Both of these later developed arrangements represented some improvement in the principal shortcoming of thermoelectric devices—low heat pumping capability.

The inability of these units to remove large quantities of heat while retaining their desired small size has reduced the extent to which the Peltier effect devices have been used commercially. This disadvantage is particularly troublesome in applications where the cooling demand is unevenly distributed in time.

Summary of the invention

In a principal aspect, the present invention takes the form of an improved refrigeration device for cooling and carbonating water. In accordance with the invention two sets of coils and a pressurized tank containing carbon dioxide are immersed in a container filled with a fluid material. A thermoelectric saddle absorbs heat from a highly conductive metal which is placed in contact with the fluid. Uncarbonated water enters one set of the coils and is pre-cooled by the fluid. The water then flows into the carbonating tank and is carbonated. Next the water flows out of the tank and through the second set of coils which are immersed in the fluid material. This further cools the carbonated water. Finally, the water passes out of the second set of coils and through a spigot. Preferably, the hot side of the thermoelectric saddle is air-cooled.

It is thus the object of the present invention to provide an improved refrigeration device capable of simultaneously cooling and carbonating water.

It is a further object of the present invention to provide an improved refrigeration device which does not utilize bulky and expensive compressors.

It is a further object of the present invention to provide an improved refrigeration device which utilizes the Peltier effect for cooling a fluid material. The fluid material in turn provides a bath for cooling water passing through coils and tanks immersed in the bath.

Still another object of the present invention is to provide a compact and portable, "solid-state" carbonated water cooler which has utility for soda fountains and the like.

These and other objects, advantages and features will be more clearly set forth in the detailed description of the preferred embodiments which follows.

Brief descriptions of the drawings

In the detailed description which follows, reference will be made to the drawings in which:

FIGURE 1 is a cutaway perspective view of a first embodiment of the invention;

FIGURE 2 is a top plan view of the embodiment shown in FIGURE 1;

FIGURE 3 is an end, cross-sectional view taken substantially along the line 3—3 of FIGURE 1;

FIGURE 4 is an enlarged sectional view of the thermoelectric saddle used as a "heat pump" for cooling the interior of the unit shown in FIGURE 1;

FIGURE 5 is a sectioned plan view of the second embodiment of the invention;

FIGURE 6 is a cross-sectional view of a second embodiment of the present invention taken along the line 6—6 of FIGURE 5; and FIGURE 7 is a cross-sectional view taken substantially along the line 7—7 in FIGURE 5.

Description of the preferred embodiments

Referring now to FIGURE 1 of the drawings, water or any other potable fluid flows into a cooler shown generally at 10 through a water inlet 12. The water passes through a check-valve 14 and into the sinuous tubing indicated generally at 16 where it is cooled prior to carbonation. Next, the water flows from the precarbonation tubing 16 into the carbonation tank 18 then passes through the sinuous, post-carbonation tubing 20 where it is still further cooled. Tubing 20 terminates at a spigot 22 where the cold soda-water may be combined with syrup from the syrup jars 23 to make soft drinks.

The thermoelectric saddle 24 is employed to maintain the interior of cooler 10 at a temperature near the freezing point of water. The pre-carbonation tubing 16, the carbonation tank 18 and the post-carbonation tubing 20 are all enclosed within a sealed tank 28. The tank 28 is filled with a fluid 26 which is hence in intimate contact with the outer surface of the pre-carbonation tubing 16, carbonation tank 18 and the post carbonation tubing 20.

To increase the efficiency of the thermoelectric saddle 24, a fan 30 forces air through a plurality of cooling fins 32. The heated air from the fins 32 exhausts through vents 34 on the sides of the cooler 10. A sealable opening 36 in the tank 18 provides access for pressurizing the tank 18 with carbon dioxide.

FIGURE 2 further illustrates the operation of the cooler 10. Water passes into the water inlet 12 normally at the available waterline pressure, normally 25 to 30 pounds per square inch. It then passes through the check valve 14. The check valve 14 prevents the water from flowing back through the inlet 12. The pre-carbonation tubing 16 is sinuously shaped so that about 50 feet of one-quarter inch tubing is positioned in the fluid 26 adjacent the tank 18. The coils 16 are preferably made from a stainless steel tubing or other highly heat conductive tubing which will not be corroded by the fluid 26.

The fluid 26 is preferably a good "heat-sink" material with a high heat conductivity, a low coefficient of expansion, a high heat of fusion and a freezing point near the freezing point of water. Materials which have proven to be useful are mixtures of water and alcohol, and mixtures of water, alcohol and anti-freeze.

The pre-cooled water passes into the carbonation tank 18 which is pressurized by carbon dioxide gas at between 60 and 80 pounds per square inch. This provides carbonation of the water to the extent commonly preferred in soft drinks. The carbonation tubing 20 provide further cooling for the carbonated water as it leaves tank 18. The post tubing 20 is preferably identical to the pre-carbonation tubing 16, both as to the material incorporated and the size of the tubing. The outer tank 28 with its attendant internal components is preferably surrounded by insulation 38 preferably formed from an expanded resin such as polystyrene "foam." A sheet metal shroud 40 is placed over the polystyrene insulation 38 for decorative and protective purposes.

FIGURE 3 further illustrates the construction of the soda-water dispenser. The outer container 28 is filled with the fluid 26. The carbonation tank 18 and the pre-carbonating and post carbonation tubing 16 and 20 are accordingly fully immersed in the fluid 26. The entire arrangement is insulated by insulating material 38 and protected by the shroud 40.

The cold diffuser plate 42 is in intimate thermal contact with the cold side of the thermoelectric saddle 24, the outer tank 28, and the inner tank 20. The plate 42 also serves to position the inner tank 20 in rigid realtionship with the container 28. Heat removal from the fins 32 is assisted by forced air from the fan 30. This reduces the temperature on the "hot side" of saddle 24 and hence provides more effective cooling of the contents of the container 28.

The fluid 26 may be selected to have a freezing point slightly above the freezing point of water. Thus, after the thermoelectric saddle has been energized for some time the fluid 26 begins to freeze. Thereafter, fluid 26 "absorbs cold" by the heat of fusion while holding a constant temperature. During periods of unusually high quantities of soda are drawn from the dispenser, the partially frozen fluid 26 melts to maintain the soda at the desired temperature. Thus, for short periods, the dispenser is capable of dispensing quantities of soda far in excess of the cooling capability of the saddle 24 acting alone. The fluid 26 also provides improved thermal contact between the cold diffuser plate 42, and tubing units 16 and 20, and the inner tank 20.

Alternatively, the fluid 26 may freeze at a lower temperature than water. Because of the temperature gradient between the cold dispersement plate 42 and the bulk of the water in the container 18 and the tubing sections 16 and 2, as well as the water flow itself, the fluid 26 actually tends to freeze before the water. Thus, the increased cold retention capabilities resulting from the heat of fusion of fluid 26 are still achieved.

FIGURE 4 illustrates the principle of the Peltier effect utilized in the thermoelectric saddle 24. A number of thermoelectric or semi-conductor elements are connected in series. These elements may be the familiar N and P junction type elements. Current flows in the direction as indicated by the arrows. At those junctions where current flows from an N element or into a P element, heat is absorbed. Where the current flows from a P element or into an N element, heat is given off. Thus it can be seen from FIGURE 4 that a temperature gradient is established across the saddle 24 with the cooler portion of the gradient in the plate 42 and the warmer portion of the gradient in the cooling fins 32.

The direct current required to operate the thermoelectric saddle 24 may be supplied by a built-in rectifier or by external D.C. source. In any event, an electrical connection 33 is provided to the saddle 24.

FIGURE 5 illustrates a second preferred embodiment of the invention. A container 44 is filled with a fluid material 46. Water passes into the pre-carbonation coils 48 through the elevated connection indicated generally at 50 into the carbonation tank 52. After the water in the tank 52 is carbonated it passes through the tube 54 into the post-carbonation coils 56. From there the water passes through an outlet for use as desired.

The bottom of the container 44 has a heat conductor plate 58 preferably constructed of aluminum. The plate 58 provides better conduction of heat from the fluid 46 to the junctions of the thermoelectric saddle 60. The saddle 60 is actuated by current through the electrical leads 49. The saddle 60 has a plurality of fins 62 which facilitate dissipation of heat from the hot side of the saddle 60. The container 44 is surrounded by a protective insulating material 64 and a protective metal shroud 66. A second sheet metal shroud 68 is positioned over the connection 50 to enhance the appearance of the unit and to protect the connection 50.

The connection 50 includes an elongated pipe 51 fastened appropriately to an upwardly extending cock 53 of the tank 52. The pipe 51 has a first conduit 54 extending below the water level in the tank 54 and a second conduit 55 leading into the tank 52. Water enters the tank 52 through the second conduit 55 and is withdrawn through the first conduit 54. The end of the second conduit 55 which leads into the tank 52 is adapted to spray or atomize the entering water. The atomized water is more readily carbonated by the carbon dioxide in the tank 52. The top of the pipe 51 is joined with a fitting 57 having dual openings which mate the conduits 54 and 55 with the coils 56 and 48 respectively.

The upwardly extending pipe 51 effectively increases the volume of the tank 52. It also provides a small pressure head on the tank 52. To assure a proper carbonation level in the water, a carbonation tank is normally only slightly filled. However, with the configuration of the present invention, more water than normal may be filled into the tank 52. For example, a tank 52 designed to properly carbonate 40 ounces of water at a time, now adequately serves to carbonate about 256 ounces of water. The cumulative effect from the pipe 51 of the increased volume and of the pressure head produces the unexpected result of increasing the carbonation capacity of the tank 52.

FIGURE 6 further illustrates the disposition of the various components of the refrigeration device. Water passes into the inlet 70 and through the valve 72. The valve 72 is actuated by the float 74 within the tank 52. Thus when the water in the tank 52 is above a certain level the valve 72 shuts off.

A needle valve 73 provides access into the tank 52 adjacent the water-level float valve 72. The needle-valve 73 is closed except when the tank is being charged with carbon dioxide. When charging the tank 52, charging device (not shown) is inserted through the opening 75 in the insulation 64 and is pressed against the needle-valve mechanism 73.

After the water passes through the valve 72, it flows through the two pre-carbonation coils 48. Next it passes through the connection 50 into the tank 52 where it is carbonated. From tank 50, soda-water passes into the post carbonation coils 56 and out through the outlet 76. The outlet 76 is connected to a dispensing spigot (seen at 78 in FIGURE 7) where the carbonated water may be mixed with syrup or other ingredients as desired.

FIGURE 7 also shows the valve construction 72 as it is actuated by the float 74 in the tank 52. As the water in the tank 52 approaches a certain maximum level it causes a float 74 to rise and shut off the valve 72. Turning on the spigot 78 will remove water from the tank 52 thereby causing the float 74 to drop. This, in turn, causes more water to enter the cooling system.

The unit shown in FIGURES 5, 6 and 7 with 2 gallon cooling capacity tank and 50 foot of ¼ inch tubing will cool approximately 9 gallons of water from an incoming temperature of 80° F. to below 40° F. when used in intermittent quantities as required in a soda fountain operation. This is approximately equivalent to the cooling efficiency exhibited in more conventional, one-third horsepower compressor cooling system.

While two preferred embodiments of the present invention have been described it is to be understood that numerous modifications may be made to the arrangements disclosed without departing from the true spirit and scope of the invention.

What is claimed is:
1. A refrigeration device for cooling and carbonating water and other potable fluids comprising, in combination,
   (a) a container having container walls, said container enclosing,
      (i) a fluid material,
      (ii) a pressurized tank containing carbon dioxide for carbonating said water, said tank being immersed in said fluid material for cooling,
      (iii) pre-carbonation coils for carrying water to said tank, said coils being immersed in said fluid material, for cooling,
      (iv) post carbonation coils for carrying said carbonated water from said tank, said post-carbonation coils being immersed in said fluid material for cooling,
   (b) a thermoelectric saddle communicating with a heat conducting plate, said plate being in said container wall in contact with said fluid material, such that said saddle removes energy from said plate and thence from said fluid material,
   (c) means for introducing water to said pre-carbonation coils, and
   (d) means for withdrawing said carbonated water from said post-carbonation coils.

2. The device of claim 1 wherein said material comprises a water and alcohol mixture with a melting point less than that of water, said mixture having a high heat of fusion, a high thermal conductivity and a low coefficient of expansion.

3. The device of claim 1 including cooling means cooperating with said thermoelectric saddle for removing heat from said saddle.

4. The device of claim 1 including check valve means cooperating with said water introduction means to insure a unidirectional flow of water through said refrigeration device, and valve means cooperating with said carbonated water withdrawing means.

5. The device of claim 1 including connection means connecting said tank to said coils, said connection means extending upwardly from said tank to create an effective increase in tank volume and a pressure head on said pressurized tank.

References Cited

UNITED STATES PATENTS

| 2,235,244 | 3/1941 | Ames | 62—393 |
| 2,254,225 | 9/1941 | Kleist | 62—393 |
| 3,250,433 | 5/1966 | Christine | 62—3 |
| 3,296,806 | 1/1967 | Gonzalez | 62—3 |

WILLIAM J. WYE, *Primary Examiner.*